United States Patent

Makram-Ebeid

[19]

[11] Patent Number: 5,909,515
[45] Date of Patent: Jun. 1, 1999

[54] METHOD FOR THE TEMPORAL FILTERING OF THE NOISE IN AN IMAGE OF A SEQUENCE OF DIGITAL IMAGES, AND DEVICE FOR CARRYING OUT THE METHOD

[75] Inventor: Sherif Makram-Ebeid, Dampierre, France

[73] Assignee: U.S. Philips Corporation, New York, N.Y.

[21] Appl. No.: 08/673,995

[22] Filed: Jul. 1, 1996

[30] Foreign Application Priority Data

Jun. 30, 1995 [FR] France .................................. 95 07888

[51] Int. Cl.⁶ ................................ G06K 9/40; G06T 5/10
[52] U.S. Cl. .......................... 382/260; 382/261; 382/264; 382/132
[58] Field of Search ..................................... 382/260, 264, 382/275, 132, 261; 348/607, 620, 701, 618; 358/463; 378/98.12, 98.2

[56] References Cited

U.S. PATENT DOCUMENTS

| | | | |
|---|---|---|---|
| 4,367,490 | 1/1983 | Riederer ................................ | 348/620 |
| 4,639,784 | 1/1987 | Fling ..................................... | 348/620 |
| 4,663,773 | 5/1987 | Haendle et al. ..................... | 378/98.12 |
| 5,018,179 | 5/1991 | Kaneko ................................ | 378/98.12 |
| 5,296,937 | 3/1994 | Nakatani et al. .................... | 378/98.12 |
| 5,309,237 | 5/1994 | Singh .................................... | 348/607 |
| 5,467,380 | 11/1995 | De Jonge et al. ..................... | 378/98.2 |
| 5,684,720 | 11/1997 | Hein ..................................... | 348/618 |

OTHER PUBLICATIONS

A New Approach to Linear Filtering and Prediction Problems, by R.E. Kalman, Transactions of the ASME, Journal of Basic Engineering, Series 82D, pp. 35–45, 1960.

*Primary Examiner*—Scott Rogers
*Attorney, Agent, or Firm*—Dwight H. Renfrew, Jr.

[57] ABSTRACT

A method for the temporal filtering of an image of a sequence of noisy digitized images includes the evaluation of an integration equation which produces the filtered intensity ($P_t^C$) of a given pixel [$A_t(x,y)$] in the present image ($J_t^P$) by evaluating the sum of the noisy intensity ($I_t^P$) of the present (t) and the product of a gain factor ($K_t^P$) and the difference of said noisy intensity of the present ($I_t^P$) and the causal filtered intensity ($P_{t-1}^C$). According to this evaluation, the gain factor ($K_t^C$) is a function of the causal gain factor ($K_{t-1}^C$) and of a continuity coefficient ($\alpha_t^C$) which measures the probability of intensity continuity between the present noisy intensity ($I_t^P$) and the causal filtered intensity ($P_{t-1}^C$). A device for carrying out this method includes a subassembly whose input (100) receives the present noisy sample ($I_t^P$) and which includes a memory (10) which supplies a causal filtered intensity ($P_{t-1}^C$), a memory (17) which supplies a causal gain factor ($K_{t-1}^C$), and means for calculating the integration equation.

19 Claims, 6 Drawing Sheets

FIG. 5C $10 \leq m_W(x,y) < 20$

METHOD FOR THE TEMPORAL FILTERING OF THE NOISE IN AN IMAGE OF A SEQUENCE OF DIGITAL IMAGES, AND DEVICE FOR CARRYING OUT THE METHOD

FIELD OF THE INVENTION

The invention relates to a method for the temporal filtering of the noise in an image of a sequence of digital images, as well as to a device for carrying out this method.

The invention can be used notably for the processing of medical images formed in an X-ray fluoroscopy mode by means of a system in which the X-ray beam has a low intensity, and produces a sequence of noisy, low-contrast images which must be filtered in order to remove the noise therefrom without degrading the details.

Temporal filtering consists of the smoothing as a function of time of a monodimensional, so-called temporal signal formed by the intensity values of a pixel having a given location in the images of the sequence.

DESCRIPTION OF THE RELATED ART

A temporal filtering method is already known from the publication by R. E. Kalman: "A new approach to linear filtering and prediction problems" in "Transactions of the ASME", Journal of Basic Engineering, Series 82D, pp. 35–45, 1960.

Kalman filtering is defined by a recursive equation producing the filtered intensity of an instantaneous pixel of an image of the sequence as a function of hypothesis made a priori, as a function of the intensity of the pixel in the same location in the preceding image of the sequence, and as a function of a factor which is referred to as a Kalman gain.

This equation can produce two recursive algorithms. A problem exists in that as soon as a slight movement occurs between two images, this movement causes an ascending or descending edge, referred to as an intensity discontinuity, which appears on the curve of said temporal signal to be smoothed.

In the first algorithm the Kalman gain is chosen to be completely constant; this causes exponential streaking which affects said intensity discontinuity edge caused by movement. Thus, a small object in the noisy original image, for example a catheter which could have been quickly moved, thus giving rise to a step in the intensity signal, may have disappeared from the filtered image because the flanks of the step are deformed by filtering. This algorithm erases the small objects.

In the second algorithm the Kalman gain is a function of the difference between the noisy intensity observed for a pixel having a given location at a given instant and the filtered intensity at the preceding instant. As a result, the temporal signal is smoothed before the discontinuity; however, it is no longer filtered behind the discontinuity, so that residual noise exists behind the intensity discontinuity edge.

The known temporal filtering method, therefore, has the drawback that it cannot be effectively applied to a series of very noisy images representing animated small objects.

Thus, the known temporal filtering method does not solve some major problems encountered when the temporal filtering method is applied to a sequence of images acquired in the X-ray fluoroscopy mode as performed, for example for the real-time following of a medical operation during which a tool of extremely small diameter, such as a catheter, is introduced into or displaced through the zone being observed.

SUMMARY OF THE INVENTION

A problem consists in that, due to the very low intensity of the fluoroscopic X-ray beam, the images of the sequence are extremely noisy and frequently contain noise peaks.

It is a further problem that, because each image of the sequence is separated from the next image by a small time gap, an important event such as the displacement of a small tool such as a catheter may take place from one image to another. The filtering of the image in which the movement of said small object appears may not distort or erase the object.

It is an object of the present invention to provide a temporal filtering method for the reduction of the noise in the successive images of a sequence of digitized images, which method:

is carried out strictly in real time, i.e. it delivers the filtered instantaneous image immediately upon appearance of the observed instantaneous image, without image delay and irrespective of the image rate in the sequence, reduces the residual noise behind a discontinuity edge of the temporal intensity signal, without damping the discontinuity edge;

is capable of reducing the noise peaks;

does not erase or distort the moving small objects.

These objects are achieved by means of a method for the temporal filtering of the noise in an image which is referred to as the present image and forms part of a sequence of images in the form of a two-dimensional matrix of pixels having intensity values which are referred to as digitized noisy samples, which method comprises the evaluation of a filtered sample, referred to as a present filtered causal sample, in order to reconstruct a noisy sample, corresponding to a pixel in a given location in the present image, by linear combination of the present noisy sample and earlier samples in the sequence, referred to as noisy causal samples, with weights which constitute coefficients of probability of intensity continuity from 0 (zero) to 1 between said noisy causal sample whereto the weight is attached and the present noisy sample, the weight attached to the present noisy sample having the value 1.

A Device For Carrying Out the Above Filtering Method Comprises an image processing system for supplying a noisy digitized intensity, referred to as the noisy present sample, of a pixel having a given location in an image in the form of a matrix of pixels arriving at said present instant, and a sub-assembly, referred to as a causal sub-assembly whose input receives the present noisy sample and which comprises a memory for supplying a digitized intensity, referred to as a noisy or filtered causal sample of the pixel preceding the present pixel, in the same location in the matrix of the preceding image, a memory for supplying a causal gain factor, and calculation means for evaluating the causal integration equation and for delivering on its output the value of the present filtered causal sample, being the sample filtered in order to reconstruct the noisy present sample.

This device offers the advantage that it can be readily put into operation and that it provides effective, strict and exact real-time temporal filtering of the noise without deteriorating the details of the image.

BRIEF DESCRIPTION OF THE DRAWINGS

The invention will be described in detail hereinafter with reference to the accompanying diagrammatic drawings; therein.

DESCRIPTION OF THE PREFERRED EMBODIMENTS

I/X-Ray Device

Figure 1:
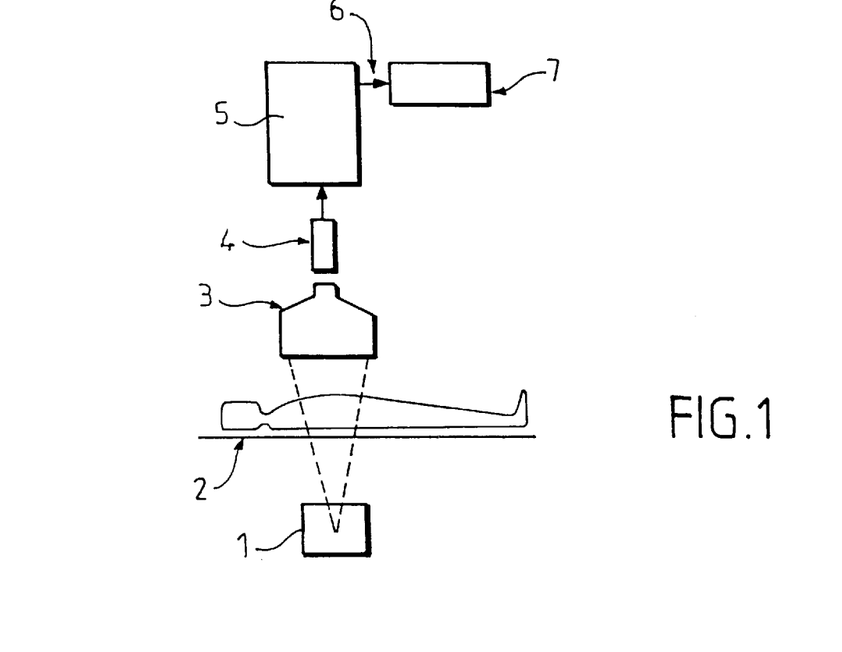
FIG. 1 shows an X-ray imaging device.

FIG. 1 shows a digital radiographic system, comprising an X-ray source, a mobile table 2 for a patient, and an image intensifier device 3 which is coupled to a camera tube 4 which applies data to a digital image processing system 5 which comprises a microprocessor. The latter comprises a plurality of outputs, an output 6 of which is coupled to a monitor 7 for the display of the sequence of radiographic images or intensity images.

The digitized radiographic image can comprise 512×512 or 1024×1024 pixels which are encoded on 8 bits or 10 bits. Each pixel can thus have one of 256 or 1024 intensity levels. For example, the dark regions have a low intensity level and the bright regions of the image have a high intensity level.

The digitized image can be acquired in the fluoroscopy mode. The invention can be used notably for the filtering of angiographic images.

In any case, the present invention takes into account neither the method used to acquire the sequence of digital images nor the nature of the objects represented therein, but concerns exclusively the filtering of the images in this sequence in order to eliminate the noise.

II/Temporal Noise Filtering Method

The present invention proposes a method for the temporal filtering of the noise successively in each image of a sequence of noisy digital images. The method executes he filtering operation in the last noisy image observed. Therefore, this method is carried out strictly in real time.

The method is capable of detecting the movement of objects recorded in the images of the sequence. It is based on adaptive recursive filtering steps.

Figure 2:
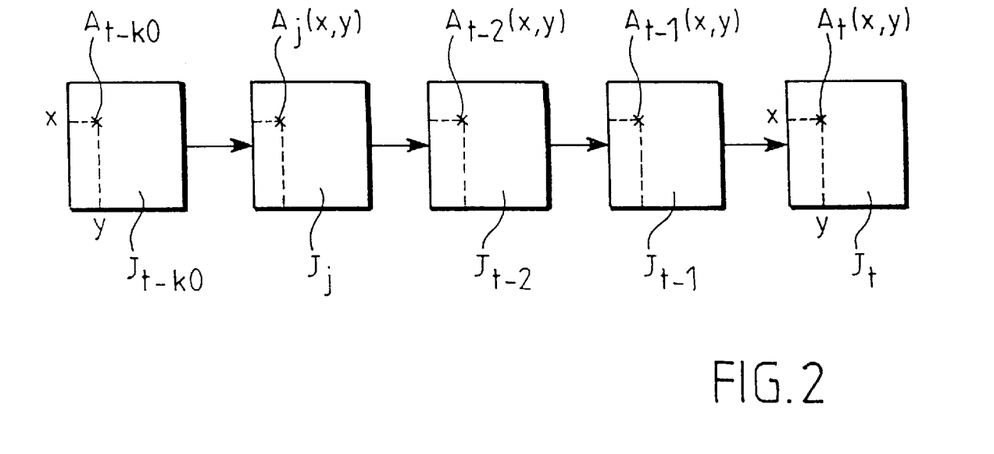
FIG. 2 shows a sequence of digital images.

Referring to FIG. 2, the method for the temporal filtering of the noise comprises first of all the acquisition and digitization of a sequence of noisy images formed at a given rate.

From the instant which is most remote in time until the most recent instant this sequence is composed of:

a number of past intensity images, denoted by $J_j^C$ and referred to as "causal images", formed after the first instant $j=t-k_o$, where $k_o$ is an integer equal to the number of images of the sequence minus one, until the instant $j=t-1$, where t is the instant of arrival of the image being filtered.

an image $J_t^P$ being filtered, referred to as the present image, which arrives at the instant $j=t$.

Each noisy digitized image $J_j$ consists of a two-dimensional matrix $A_j(x, y)$ of pixels, each of which is characterized by its coordinates x, y in the matrix and by an intensity level $I_j(x, y)$ on an intensity level scale, where j is the index corresponding to that of the image.

Figure 3A:
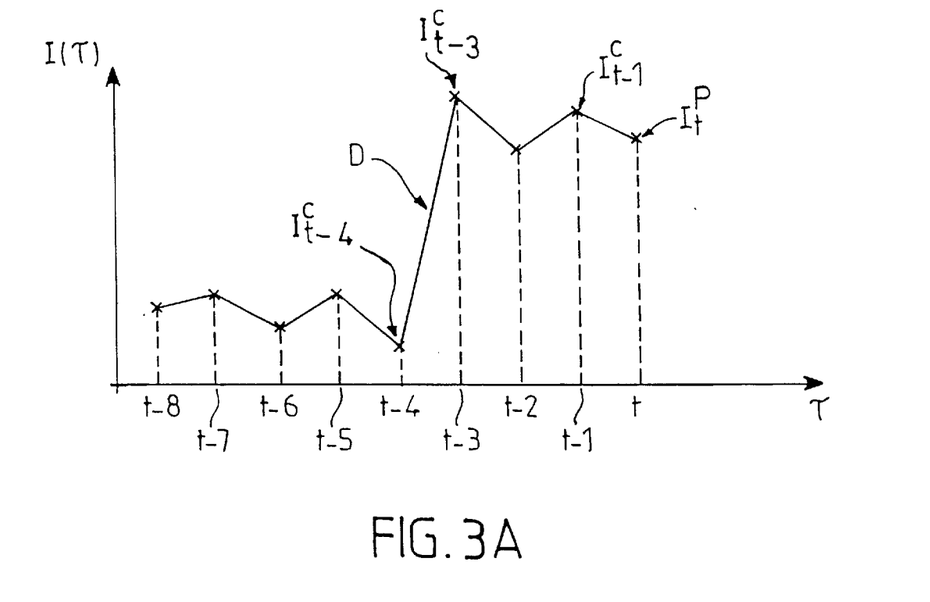
FIG. 3A shows a noisy temporal signal, corresponding to a pixel A situated at the coordinates x, y, with a discontinuity due to a movement.
Figure 3B:
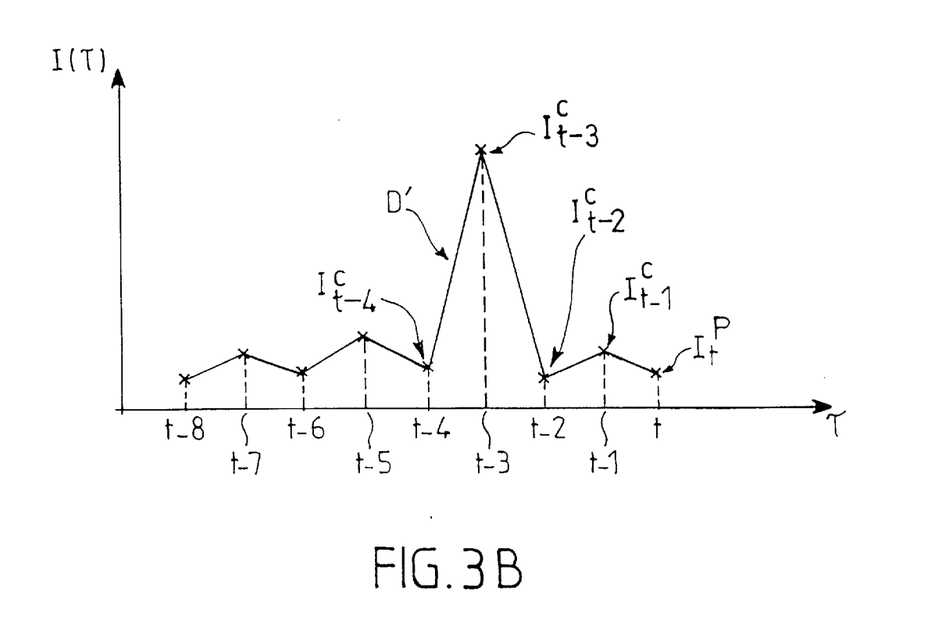
FIG. 3B shows another noisy temporal signal with a noise peak.

A so-called noisy temporal signal is formed of different intensity levels $I_j(x, y)$ of pixels $A_j(x, y)$ as a function of the time $\tau$ as shown in the FIGS. 3A and 3B, in which the intensity I is plotted on the ordinate and $\tau$ on the abscissa. The temporal filtering method in accordance with the invention aims to filter or smooth the noise affecting said temporal signal $I(\tau)$ in order to obtain a filtered temporal signal $P(\tau)$ as shown in the FIGS. 4A and 4C. Hereinafter, the intensities constituting the points of the temporal signal $I(\tau)$ will be referred to as "samples". The past or causal intensities are called $I_j^C$ and the present intensity is called $I_t^P$.

The method in accordance with the invention concerns the case where the principal movements occurring in the image sequence have already been compensated for by movement compensation methods known from the state of the art. For example, translation correction methods. However, the movement estimation methods requiring vast amounts of calculation time are to be avoided. This type of method must be avoided, because the invention aims to provide a strictly real-time method.

It is to be noted that, even though a movement compensation method has been applied to a sequence of images, it can never be ensured that all movements have indeed been compensated for in reality, because the movement compensation techniques are not perfect.

In order to take this fact into account, the present method performs a filtering operation on the noise of the temporal signal $I(\tau)$ by treating the small residual or non-compensatable local movements of objects in the image sequence.

This method performs a filtering operation on the noisy sample $I_t^P$ arriving at the present instant t, and produces a filtered sample $P_t^C$ by utilizing the noisy sample $I_t^P$ of the present instant t, and the earlier samples, referred to as noisy causal samples $I_{t-kO}^C, \ldots I_{t-3}^C, I_{t-2}^C, I_{t-1}^C$, observed at the past instants from $t-k_o$ to $t-1$.

The temporal filtering is preferably performed individually for each pixel $A_j(x, y)$ at the various coordinates x, y of the two-dimensional matrix.

FIG. 3A shows a noisy temporal signal $I(\tau)$ which comprises, by way of example, an intensity discontinuity D between the sample $I_{t-3}^C$ and the sample $I_{t-4}^C$ said discontinuity being due to a small local movement. This small local movement translates as an ascending edge of the temporal signal $I(\tau)$ between the instant $t-2$ and the instant $t-3$, a high signal "plateau" between the instants $t-3$ and t, and a "depression" at the instants preceding the instant $t-4$.

Figure 4A:
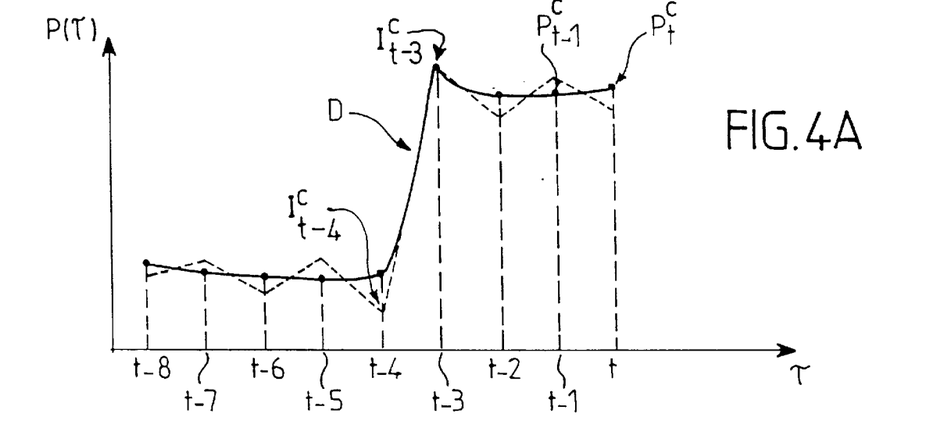
FIG. 4A shows a filtered temporal signal corresponding to the noisy signal of FIG. 3A.

The temporal filtering in accordance with the invention can adapt itself to an intensity discontinuity such as D. Thus, the FIGS. 4A and 4C show the temporal signal $P(\tau)$ smoothed by various versions of the method in accordance with the invention.

This temporal signal also exhibits small sawteeth between the instants t−8 and t−4 because, due to the noise, the intensity level of a pixel having the same coordinates (x, y) in the images of the sequence varies continuously, thus causing a snowfall aspect. Filtering enables this aspect to be suppressed by smoothing the temporal signal I(τ) to a constant mean value in relation to a given pixel.

FIG. 3B shows, moreover, a noisy temporal signal I(τ) having, by way of example, a noise peak D' which appears between the instants t−4 and t−2, that is to say at the instant t−3. Such a noise peak D' is distinct from an intensity discontinuity such as D of FIG. 3A in that it does not correspond to a real spatial movement phenomenon. Such a noise peak can be filtered by means of the method proposed by the invention.

The filtered sample $P_t^C$, corresponding to the present noisy sample $I_t^P$, is expressed as:

$$P_t^C = \frac{\sum_{j=t-k_o}^{j=t-1} b_j^C \times I_j^C + I_t^P}{\sum_{j=t-k_o}^{j=t-1} b_j^C + 1} \quad (1)$$

The filtered sample $P_t^C$, or filtered temporal signal at the instant, t, is a linear combination of noisy samples observed at the causal instants from $j=t-k_o$ until $j=t-1$, and of the noisy sample observed at the instant t.

In the formula (1) of the filtered signal $P^C$ a weight $b_j^C$ is assigned to the causal samples $I_{t-1}^C$, $I_{t-2}^C$ etc.

The denominator of the formula (1) is a normalization factor whose presence is based on the fact that the sum of the weights applied to the various samples must be equal to 1 in order to ensure that the mean value of the filtered signal $P_t^C$ equals the mean value of the noisy signal $I_t^P$.

The temporal filtering method is based on a linear combination of causal samples with the present sample, in which the weights $b_j^C$ attached to the causal samples have a specific form, the weight attached to the present sample being 1.

The weight attached to a given causal sample is a probability of intensity continuity between said given causal sample and the present sample.

Generally speaking, the formulation of the causal weight $b_{t-k}^C$ to be assigned to a causal sample $I_{t-k}^C$ is given by the relation (2):

$$b_{t-k}^C = \prod_{t-k+1}^{t} \alpha_j^C, \text{ with } k > 1 \quad (2)$$

where $\alpha_j^C$ is the probability of intensity continuity between the successive causal samples after $I_{t-k}^C$ until $I_t^P$. According to the relation (2) a weight $b_{t-k}^C$ relating to a causal sample $I_{t-k}^C$ equals the product of all probabilities of intensity continuity $\alpha_j^C$ after the causal instant $j=t-k+1$ until the present instant t.

Thus, the determination of the weight attached to a given causal sample according to the formule (1) is based on the hypothesis that said given sample is retained and taken into account in the linear combination only if it does not deviate too much from the present example, signifying that it relates to the same object.

According to this hypothesis, for example the causal weight $b_{t-1}^C$, relating to the causal sample $I_{t-1}^C$, is formulated by writing that $b_{t-1}^C$ is a function of the absolute value of the difference between the sample $I_t^P$ at the present instant and the sample $I_{t-1}^C$ at the preceding instant.

Preferably, the causal weight $b_{t-1}^C$ is a function of the difference:

$$\Delta^C = |I_t^P - P_{t-1}^C| \quad (6^C)$$

where $P_{t-1}^C$ is the sample already filtered at the preceding instant t−1, so that presumably it is less noisy than $I_{t-1}^C$ as a result of filtering. If the difference between the samples $I_t^P$ and $P_{t-1}^C$ is small, a "high" value near 1 is assigned to the corresponding weight $b_{t-1}^C$. If this difference is large, a value close to zero is assigned to the weight $b_{t-1}^C$. In that case the sample $I_{t-1}^C$ is practically not taken into account.

Subsequently, in this example the second causal weight $b_{t-2}^C$, relating to the causal sample $I_{t-2}^C$, is formulated by writing that the weight $b_{t-2}^C$ is a function of not only the difference between the sample at the instant t and the sample at the instant t−1, but also a function of the difference between the sample at the instant t−1 and the sample at the instant t−2. Thus, the weight $b_{t-2}^C$ has a high value near 1 if exclusively samples are taken into account which have not been subjected to modifications, other than those due to the noise, with respect to the present sample $I_t^P$, i.e. if the condition is imposed that the differences between the samples taken into account must be small. This leads to the formulation of causal weights $b_j^C$ as products of functions of intensity differences appearing in the temporal signal, i.e. to the formulation of these weights as products of the probability of intensity continuity between the samples preceding the present example to be filtered.

Thus, the formulation of the causal weight relating to the sample $I_{t-1}^C$ is:

$$b_{t-1}^C = \alpha_t^C \quad (2a)$$

where $\alpha_t^C$ is a probability of intensity continuity between the present sample $I_t^P$ and the filtered sample $P_{t-1}^C$. The intensity continuity between the sample at the instant t and the sample at the preceding instant t−1 translates as a high continuity probability $\alpha_t^C$. An intensity discontinuity between the samples translates as $\alpha_t^C$ close to 0.

The formulation of the causal weight relating to the sample $I_{t-2}^C$ is:

$$b_{t-2}^C = \alpha_t^C \times \alpha_{t-1}^C \quad (2b)$$

where $\alpha_{t-1}^C$ is the probability of intensity continuity between the sample at the instant t−1 and the sample at the instant t−2.

The intensity continuity of samples between the instant t and the instant t−2 implies intensity continuity between the instants t and t−1 and intensity continuity between the instants t−1 and t−2, which translates as the product of probabilities (2b) in which the probability of intensity continuity between the instants t and t−1 is high and the probability of intensity continuity between the instants t−1 and t−2 is also high.

The formulation of the causal weight relating to the sample $I_{t-3}^C$ is then:

$$b_{t-3}^C = \alpha_{t-2} \times \alpha_{t-1} \times \alpha_t \quad (2c) \text{ etc.}$$

Thus, in the example of FIG. 3A the probability of continuity $\alpha_{t-3}^C$ is very close to zero because of the intensity discontinuity D between the samples $I_{t-4}^C$ et $I_{t-3}^C$. The weight $b_{t-4}^C$ obtained by the product of the probabilities, including said probability $\alpha_{t-3}^C$, also tends towards zero. The weight $b_{t-5}^C$ also tends towards zero, because its formulation is a product which also contains said probability close to zero. As soon as a probability close to zero is present in the product of probabilities supplying a weight $b_j^C$, the presence of this probability cancels this product and all products corresponding to the instants preceding the instant at which said probability close to zero appeared. As a result, the weights $b_j^C$ of the causal samples corresponding to said preceding instants are also close to zero. In the specific example of FIG. 3A the causal weights are:

$$b_{t-1} \cong 1;\ b_{t-2}^C \cong 1;\ b_{t-3}^C \cong 1;\ b_{t-4}^C \cong 0;\ b_{t-5}^C = 0$$

As a result of the specific formulation (2) of the causal coefficients $b_j^C$, the equation (1) whose calculation was very complex is transformed into a single group of three simple relations for performing the desired temporal filtering.

The linear equation (1), in which the causal weights have a specific form (2), leads to a formulation of a recursive equation ($3^C$) as follows:

$$P_t^C = P_{t-1}^C + K_t^C X(I_t^P - P_{t-1}^C) \tag{$3^C$}$$

This equation ($3^C$), referred to as an integration equation, takes into account the filtered causal sample $P_{t-1}^C$ at the instant t−1, modified by what is called hereinafter a causal innovation term which is formed by the difference between the filtered sample $P_{t-1}^C$ at the instant t−1 and the noisy sample $I_t^P$ observed at the present instant t. This innovation term is multiplied by a term which is called a causal gain $K_t^C$ which varies between 0 and 1. This first equation ($3^C$) produces a filtered value $P_t^C$ which is the desired filtered sample.

The causal gain $K_t^C$ is not a Kalman gain, but a completely different gain factor which is given by the following recursive equation ($4^C$):

$$K_t^C = \frac{K_{t-1}^C}{K_{t-1}^C + \alpha_t^C} \tag{$4^C$}$$

For the transition between the equations (1) and (2) and the equations ($3^C$) and ($4^C$), the causal gain is the inverse of the sum of the causal weights:

$$K_t^C = 1 \bigg/ \sum_{j=t-ko}^{j=t-1} b_j^C$$

and, moreover, as has been stated above: $\alpha_t^C = b_{t-1}^C$ ($2a$) which expresses that the continuity probability $\alpha_t^C$ is the weight of the causal sample $I_{t-1}^C$ preceding the present sample $I_t^P$, which probability is referred to hereinafter as the causal coefficient of continuity.

The transition between the equations (1)+(2) and the equation ($3^C$) is thus based on the system of causal equations:

$$P_t^C = P_{t-1}^C + K_t^C x(I_t + P_{t-1}^C), \text{ being the integration equation} \tag{$3^C$}$$

$$K_t^C = \frac{K_{t-1}^C}{K_{t-1}^C + \alpha_t^C},$$

$$\alpha_t^C = F^C\left(\frac{\Delta^C}{S_t^C}\right),$$

where $S_t^C$ is a normalization factor and $F^C$ is a function to be defined hereinafter.

The iteration of the equation ($3^C$), commencing at $t-k_o$ in time, enables the equation (1) to be retrieved exactly as formulated above.

The formulation ($3^C$) of the integration equation thus corresponds directly to this linear combination (1) of samples associated with specific weights which are functions of the intensity continuity between the successive samples and are determined by the product of the continuity probabilities (2) between the successive samples from the sample whose weight is calculated until the present sample.

Formulation of the Causal Discontinuity Coefficient $\alpha_t^C$

The causal continuity coefficient $\alpha_t^C$ is defined as a function of the difference $\Delta^C = |I_t^P - P_{t-1}^C|$ ($6^C$).

It is advantageous to determine whether the difference $\Delta^C$ relates to a discontinuity such as D in FIG. 3A or whether it relates exclusively to noise.

In order to determine the noise participation, the difference $\Delta^C$ is normalized by a factor $S_t^C$ which takes into account the variance of the noise relative to each sample of this discontinuity $\Delta^C$. The standard deviation of the noise, referred to as $\sigma_B$ and measured in intensity levels for each sample, can be estimated by means of any known method or can be estimated a priori.

It will be recalled that the variance $\sigma_B^2$ of the noise is the mean deviation to the square of the noise in a region considered in the image, the intensity deviation due to the noise being measured with respect to the mean local intensity.

The determination of the standard noise deviation may be complicated by the fact that in the system shown in FIG. 1 an image transformation is introduced according to a rule for the compression of low and high intensity levels, before the digitization of the signal, so as to take into account the fact that the noise is less visible to the eye in the very dark or very bright regions than in the regions of mean intensity. The standard noise deviation $\sigma_B$ is then a function of the intensity at any instant at any pixel.

The determination of the standard noise deviation, therefore, must be performed locally on each of the pixels of the image as a function of the mean intensity of the corresponding region: the noise is thus spatially characterized because of the fact that a variance of the noise and a mean value of the signal observed are locally calculated so that a separation is made of the noise which is due to the image itself or the signal.

Figure 5A:
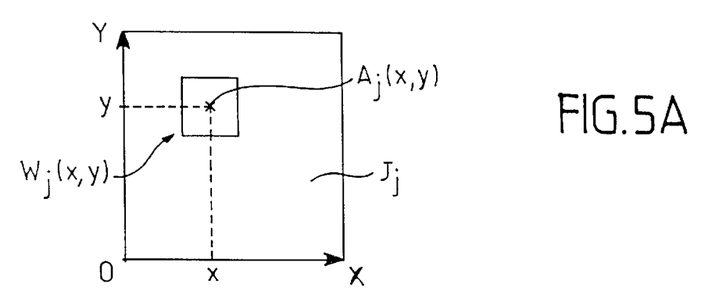
FIGS. 5A to 5C illustrate a determination of the standard deviation of the noise $\sigma_B$ with respect to the mean noise $m_B$.

In conformity with a method which is proposed by way of example with reference to FIG. 5A, in an image $J_j$ there are defined small windows $W_j$, typically of zones of 5×5 or 3×3 pixels around each pixel $A_j(x,y)$. In each of these small windows $W_j(x,y)$ the variance of the noise and the mean intensity observed are determined.

To this end, n being the number of pixels of a small window $W_j(x,y)$, for each position of said small window centered around a pixel $A_j(x,y)$ there are determined:

the intensities $I_j(k,l)$ of each of the pixels of the small window $W_j(x,y)$, the indices k and l being the coordinates of pixels considered to be situated within said window with respect to the rectangular coordinates X and Y of the image $J_j$;

the mean intensity $m_W(x,y)$ in said window, at this position, given by the relation:

$$m_W(x, y) = \frac{1}{n}\Sigma I_j(k, l) \quad (8^C)$$

the variance of the noise $\sigma_{BW}(x,y)$ to the square, within this window, given by the relation:

$$\sigma_{BW}^2(x, y)^2 = \frac{1}{n}\Sigma[I_j(k, l) - m_W(x, y)]^2 \quad (9^C)$$

in which below the sum sign $\Sigma$ the difference to the square between the intensities of each pixel of the window and the mean value $m_W(x,y)$ is given; moreover, the mean value of this sum over the number n of pixels in the window is taken.

Figure 5B:
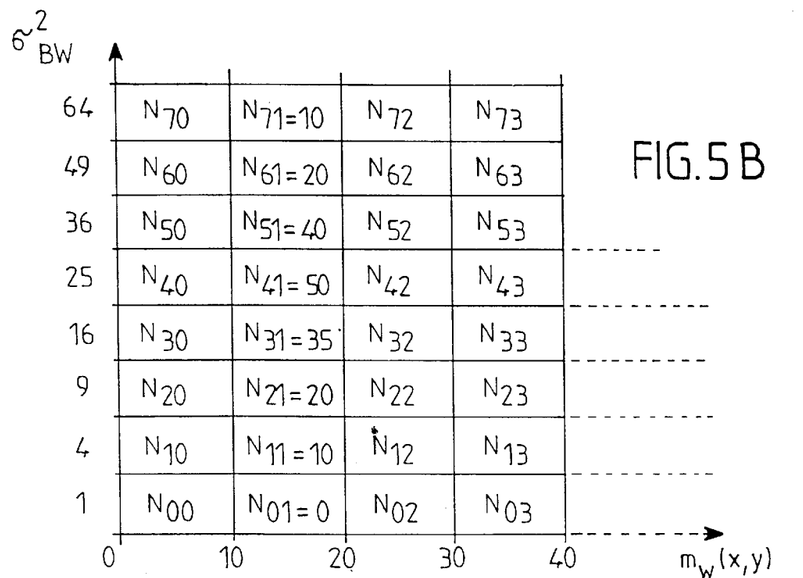

Referring to FIG. 5B, subsequently a two-dimensional histogram is formed in which mean values $m_W(x,y)$ of the intensity are plotted on the horizontal axis with a given precision: for example, 10 grey levels by 10 grey levels, while on the vertical axis the mean value of the variance is plotted. In each interval of the mean intensity $m_W(x,y)$, plotted on the horizontal axis, there is found the balance of the frequency N of the variance or the number of times that a given variance occurs for this interval of the mean intensity. By way of example and for clarity of the explanation, it is shown in FIG. 7B that between the values 10 and 20 of the mean value $m_W(x,y)$:

the frequency $N_{01}$ of the variance having the value 1 is 0;

the frequency $N_{11}$ of the variance having the value 4 is 10;

the frequency $N_{21}$ of the variance having the value 9 is 20;

the frequency $N_{31}$ of the variance having the value 16 is 35;

the frequency $N_{41}$ of the variance having the value 25 is . . . etc.

Figure 5C:
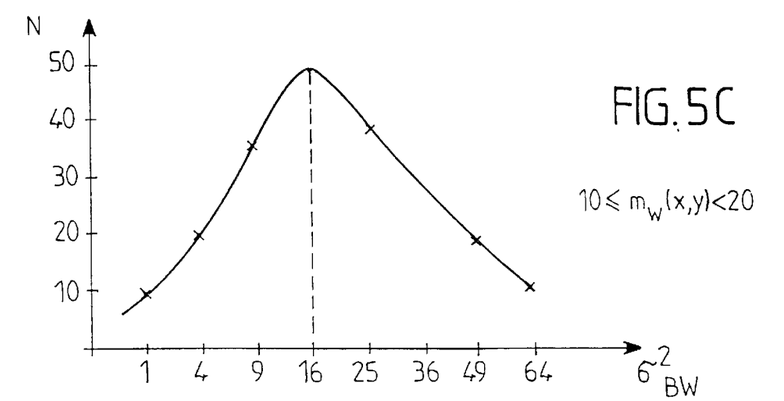

The proposed method is continued with reference to FIG. 5C in which the curve of the frequency N of occurrence of the variances plotted on the vertical axis as a function of the variance $\sigma^{BW2}(x,y)$ is traced for any interval of the mean intensity $m_W(x,y)$ considered. This curve of the frequencies N as a function of the variance extends through a maximum, giving a possible value of the variance, and must be determined for each of the intervals of the mean intensity.

Thus, a noise variance is obtained as a function of the mean intensity value attributed to each pixel $A_j(x,y)$. This technique enables information concerning the noise to be extracted from the image itself.

The standard noise deviation $\sigma_B$ is then obtained by calculation of the square root of the noise variance:

$$\sigma_B = \sqrt{\frac{1}{n}\sum_{j=t-N+1}^{j=t}(I_j^C - m_W)^2} \quad (10^C)$$

The variance of the noise contribution entering the difference $\Delta^C$ can be formulated as:

$$\sigma_B^2 \times \frac{2}{2 - K_{t-1}^C}$$

in the steady state; this value is used as an approximation for the normalization of $\Delta^C$. The normalization factor of the difference $\Delta^C$ is then given by the relation:

$$S_t^C = \sigma_B \sqrt{\frac{2}{2 - K_{t-1}^C}} \quad (11^C)$$

In the equation ($5^C$), the continuity coefficient $\alpha_t^C$, therefore, is a function of a difference $\Delta^C$ given by the relation ($6^C$), normalized by an approximation $S_t^C$ of the standard noise deviation $\sigma_B$, in order to take into account the fact that the difference $\Delta^C$ is affected by the noise. To this end, the calculation of the coefficient $\alpha_t^C$ comprises, for each point of the curve $I(\tau)$ of the temporal signal, the determination of the standard noise deviation $\sigma_B$ with respect to the mean value.

The strength of the filtering method proposed in accordance with the invention and based on calculation of the causal integration function ($3^C$), in association with the relations ($4^C$) and ($5^C$), resides notably in the fact that the expression $\alpha_t^C$ is normalized as proposed. Because this normalization takes into account not only the variance of the noise of the present sample $I_t^P$ but also the variance of the noise of the filtered sample $P_{t-1}^C$, the equation ($5^C$), giving the gain factor, enables estimation of the residual noise for each filtered sample.

The recursive integration function ($3^C$) can now be readily calculated, because it depends exclusively on the gain factor $K_t^C$ given by the equation ($4^C$). The gain factor $K_t^C$ itself depends exclusively on the gain factor $K_{t-1}^C$ already calculated in the past and on the continuity coefficient $\alpha_t^C$. The continuity coefficient $\alpha_t^C$ also depends on the already calculated gain factor $K_{t-1}^C$, so that the continuity coefficient $\alpha_t^C$ must first be calculated, after which the gain equation $K_t^C$ can be readily calculated by means of the continuity coefficient $\alpha_t^C$, and the filtered sample $P_t^C$ can subsequently be easily calculated by means of the relation ($3^C$).

Definition of the Function $F^C$

For the calculation of the equation ($5^C$), giving $\alpha_t^C$, the function $F^C$ is defined as described hereinafter.

The argument of the function $F^C$ is denoted as $Z^C$:

$$z^C = \frac{\Delta^C}{S_t^C} = \left| \frac{I_t^P - P_{t-1}^C}{\sigma_B \sqrt{\frac{2}{2 - K_{t-1}^C}}} \right| \quad (12^C)$$

The function $F^C(Z_C)$ is traced, by way of example, in the FIGS. $6^A$ to $6^D$ by plotting its values on the ordinate and by plotting $Z^C$ on the abscissa.

The function $F^C(Z^C)$ first has a constant value $F^C$max when $0 \leq Z^C \leq 1$; subsequently, the function $F^C(Z^C)$ decreases to a value $F^C$min for $1 < Z^C$. The value $F^C$max is such that $F^C$max$\leq 1$. The value $F^C$min is such that $0 \leq F^C$min. Examples of such functions $F^C(Z^C)$ are given hereinafter.

EXAMPLE I

Figure 6A:
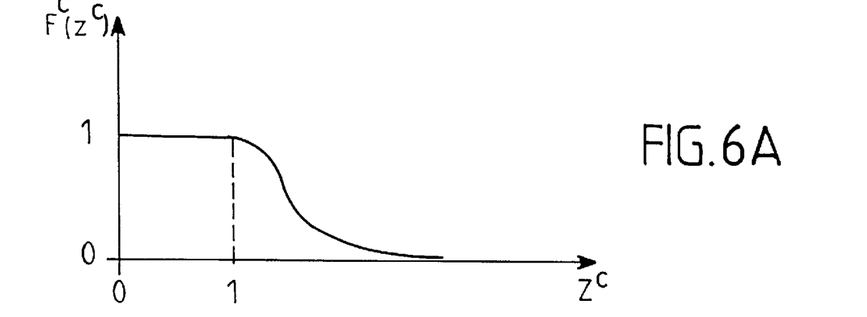
FIGS. 6A to 6D show various feasible examples of the function $F^C(Z^C)$.

Illustrated by FIG. 6A

The function $F^C(Z^C)$ is constant and equal to a value $F^C$max=1 if $0 \leq Z^C \leq 1$; subsequently, the function $F^C(Z^C)$ is chosen so as to decrease to a value $F^C$min=0 if $1 \leq Z^C$. The function $F^C(Z^C)$ preferably has, in this region, a Gaussian shape as applied by a normalization factor, so that:

$$F^C(Z^C) = \exp\left(\frac{(z^C)^2}{0,75}\right)$$

EXAMPLE II

Figure 6B:
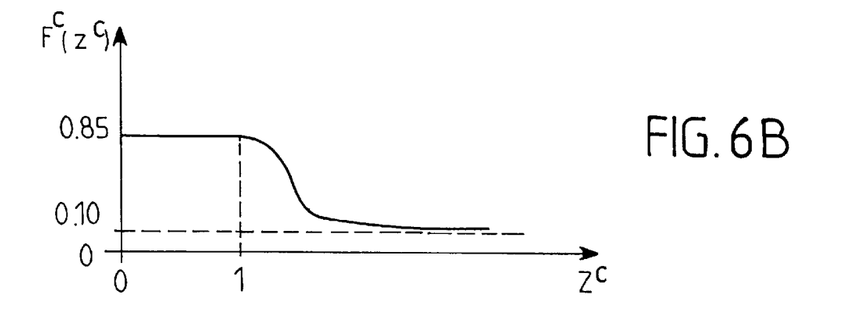

Illustrated by FIG. 6B

The function $F^C(Z^C)$ is constant and equal to a value $F^C\text{max}$ smaller than 1; for example, $F^C\text{max}=0.85$ if $0 \leq Z^C <1$; subsequently, the function $F^C(Z^C)$ decreases if $1 \leq Z^C$. The function $F^C(Z^C)$ cannot decrease beyond, for example 0.10. The function $F^C(Z^C)$ may in that case be a shifted Gaussian curve.

EXAMPLE III

Figure 6C:
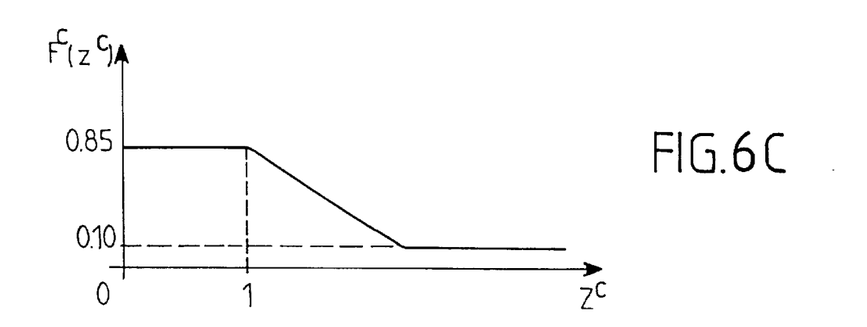

Illustrated by FIG. 6C

The function $F^C(Z^C)$ is constant and equal to a value $F^C\text{max}$ smaller than 1, but close to 1, so that $F^C\text{max}=0.85$ if $0 \geq Z^C \geq 1$. Subsequently, the function $F^C(Z)$ decreases linearly to a value Fmin near 0; for example, $F^C\text{min}=0.10$; it reaches this value, for example for $Z^C=2$. Subsequently, the function $F^C(Z^C)$ is linearly constant and equal to $F^C\text{min}= 0.10$ for $2 < Z^C$.

EXAMPLE IV

Figure 6D:
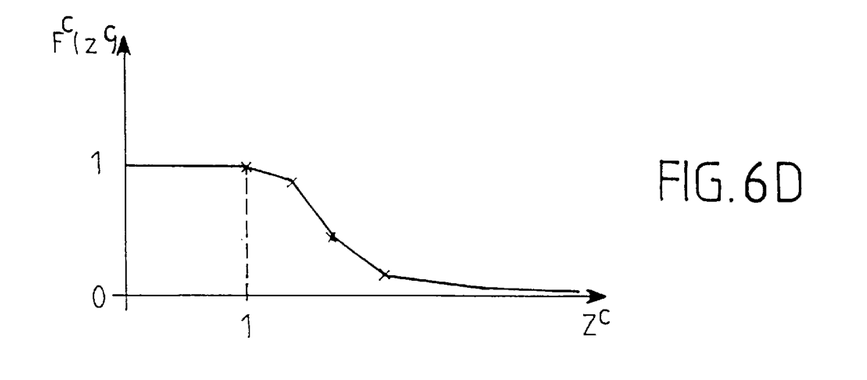

Illustrated by FIG. 6D

The function $F^C(Z^C)$ is a segmented linear function which is an approximation of the finction of example I or of the function of example II.

The function $F^C(Z^C)$ may also be chosen from other appropriate forms whose definition is up to a person skilled in the art.

The function $F^C(Z^C)$ controls the filtering power. When $F^C\text{max}=1$, the filtering power is maximum. When $F^C\text{max}$ is smaller than 1, the filtering power is slightly limited. When $F^C\text{min}$ is larger than zero, the filtering power is never zero.

Embodiment of the Invention With a Function $F^C$ of Example I

The FIGS. 4A and 4C both show a filtered temporal signal $P(\tau)$ obtained on the basis of a noisy temporal signal $I(\tau)$ containing at least one intensity discontinuity D due to a movement as illustrated in FIG. 3A.

This filtering operation is performed by means of a filtering system ($3^C$), ($4^C$), ($5^C$) in circumstances in which $F^C(Z^C)$ is a function analogous to that of the example I illustrated by FIG. 6A.

Referring to FIG. 4A, the causal filtering produces smoothing of the temporal signal, to the left of the discontinuity D, in the causal direction from t−4 towards thereafter, because of the discontinuity D, the causal filtering cannot carry out the filtering of the noisy sample $I_{t-3}{}^C$ at t−3, because it has "forgotten" the past which is formed by the samples $I_{t-4}{}^C$, $I_{t-5}{}^C$ etc.; the causal filtering is very effective at $I_{t-4}{}^C$ of the curve of the temporal signal and to the left of this sample, after which the signal is directly the noisy signal $I_{t-3}{}^C$ at t−3, because at that point the causal filtering produces only the noisy intensity observed which has not been modified by the data of the past. Subsequently, the causal filtering produces again a signal which is smoothed very well to the right of the sample $I_{t-3}{}^C$, starting from the next point, at t−2, of the temporal signal, and the sample at t−3 may be taken into account because of the fact that there is no intensity discontinuity between the instants t−3 and t−2.

Therefore, after causal filtering as shown in FIG. 4A, the first noise tooth at $I_{t-3}{}^C$ remains at the instant t−3 because of the fact that the coefficients $b_{t-4}{}^C$ assigned to the signal at t−4 are zero as the intensity difference between t−3 and t−4 is large.

On the other hand, referring to FIG. 3B, the noisy temporal signal $I(\tau)$ may also comprise a noise peak D', which appears, for example at the instant t−3. The causal filtering does not enable the discontinuity D', caused by a noise peak in the noisy temporal signal of FIG. 3B, to be distinguished from the discontinuity D, caused by a movement, in the noisy temporal signal of FIG. 3A. Therefore, the anti-causal filtering will not enable appropriate filtering of a noise peak D' as shown in FIG. 3B if the function $F^C(Z^C)$ chosen is that of the example I illustrated by FIG. 7A.

Embodiment of the Invention With a Function $F^C$ of Example II

In accordance with the invention, the filtering power can be changed at will by changing the values of $F^C\text{min}$ and $F^C\text{max}$ so as to reduce as well as possible the residual noisy intensity peak, occurring to the right of the intensity discontinuity D of the temporal signal in the foregoing example, while preserving as perfect as possible smoothing of this temporal signal.

Thus, in accordance with the invention the past can only be forgotten "to a certain extent", so that the causal filtering cannot be completely zero at $I_{t-3}{}^C$.

Referring to FIG. 4C, showing the result of the filtering of the signal of FIG. 3A while utilizing a function $F^C(Z^C)$, where $F^C\text{max}=0.85$ and $F^C\text{min}=0.10$, as illustrated in FIG. 6B, it appears that the first noise tooth at $I_{t-3}{}^C$, after the discontinuity D, is damped because the function $F^C(Z^C)$ is never zero since in this example it is at least equal to 0.10. Therefore, the data at the instant t−4 is always taken into account and enables the filtering of the signal at the instant t−3, to at least some extent, after the intensity discontinuity D.

Moreover, as shown above, the filtering power can also be changed at will by changing the values $F^C{}_{min}$ and $F^C{}_{max}$ for filtering a noise peak D' as shown in FIG. 3B.

Figure 4B:
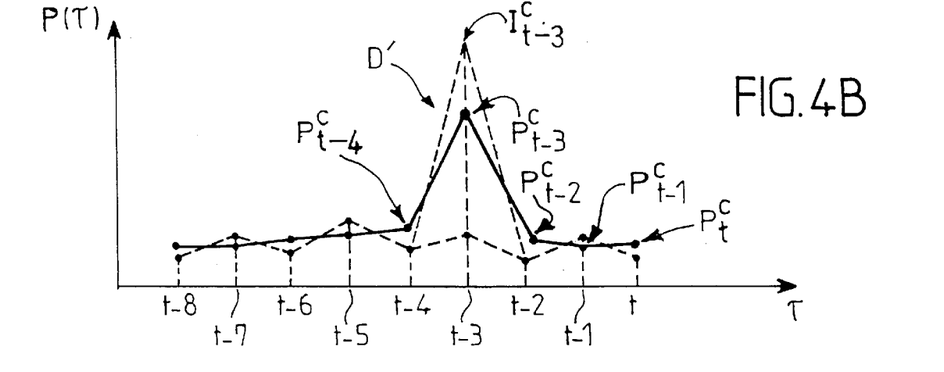
FIG. 4B shows a filtered temporal signal corresponding to the noisy signal of FIG. 3B.
Figure 4C:
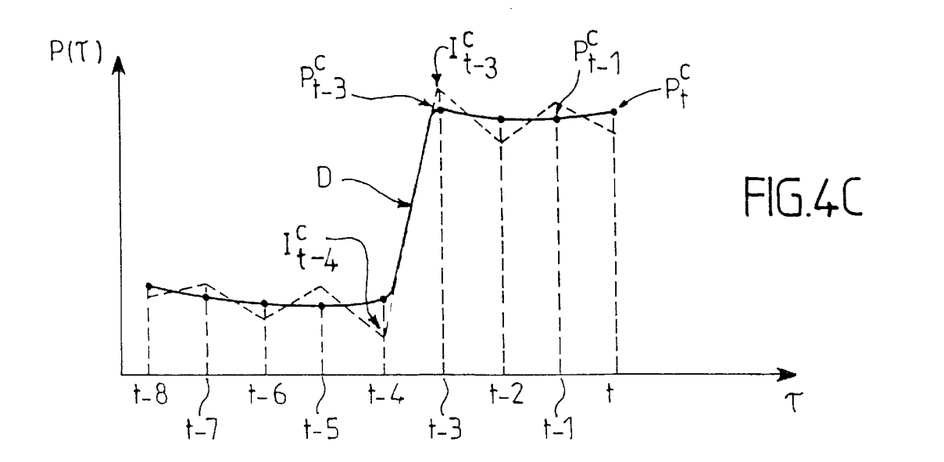
FIG. 4C shows a filtered temporal signal corresponding to the noisy temporal signal of FIG. 3A, in an alternative embodiment of the invention.

Thus, considering FIG. 4B which shows the result of the filtering of the signal of FIG. 3B while utilizing a function $F^C(Z^C)$ with $F^C\text{max}=0.85$ and $F^C\text{min}=0.10$, as illustrated in FIG. 6B, the noise peak D' is damped because the function $F^C(Z^C)$ is never zero since the data at the instant t−4 is always taken into account and enables always the filtering, of the signal of the noise peak D', to at least some extent, at the instant t−3.

It is to be noted that the first filtered image is actually the second image arriving in the sequence, because it is necessary to have data of the preceding image available for the filtering of the instantaneous image. The data of the first image of the sequence is not filtered for its actual display and is not filtered so as to perform the filtering of the image arriving as the second one. The real filtering starts with this second image.

III/Device for Carrying Out the Method

Figure 7:
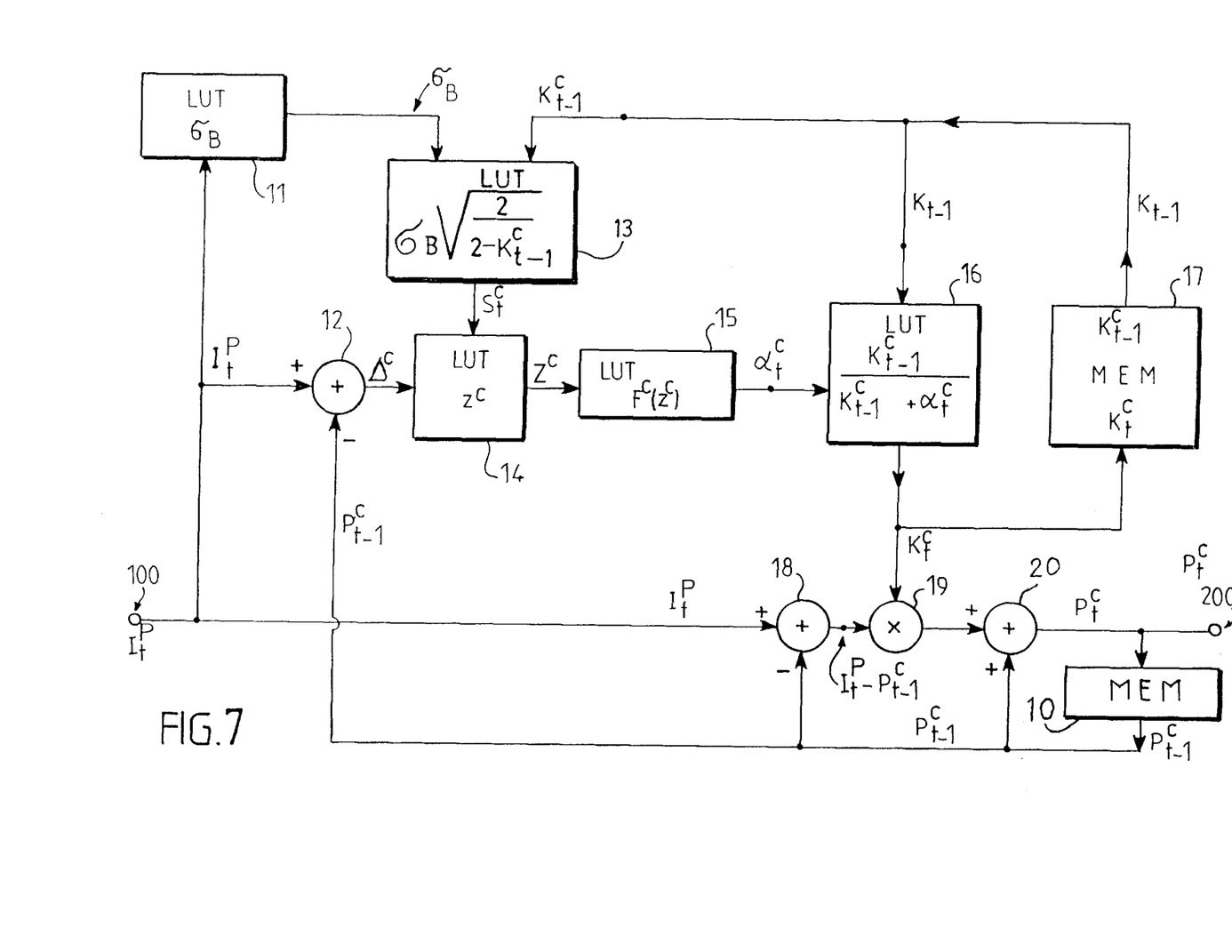
FIG. 7 illustrates, in the form of functional blocks, a device for carrying out the temporal filtering method.

FIG. 7 shows a simple device, in the form of functional blocks, for carrying out the described filtering method.

For the present image at the instant t the noisy intensity $I_t^P$ of a pixel having the location x, y is applied to the input 100 of the device.

The noisy intensity $I_t^P$ follows two paths.

In one path, the noisy signal $I_t^P$ is applied to a function $\sigma_B$ tabulated in a Table LUT 11 which supplies the standard noise deviation $\sigma_B$ of the noisy signal $I_t^P$. The standard noise deviation $\sigma_B$ is available at the output of the Table 11.

The gains K are stored in the memory MEM 17. The memory MEM 17 comprises an output for supplying the gains $K_{t-1}^C$ of the preceding instant, for the pixel having the given location x, y, and an input for receiving the gains $K_t^C$ calculated for the present instant t.

The device comprises a Table LUT 13 which contains tabulated values in order to supply directly the value:

$$S_t^C = \sigma_B \sqrt{\frac{2}{2 - K_{t-1}^C}} \qquad (11^C)$$

as soon as the value $\Gamma_B$ from the Table LUT 11 and the value of the gain $K_{t-1}^C$ from the memory MEM 17 are entered therein. The value $S_t^C$ constitutes the denominator of the expression ($5^C$), enabling the calculation of the continuity coefficient $\alpha_t^C$. The denominator value $S_t^C$ is available at the output of the Table LUT 13 and is entered into the table LUT 14.

The device comprises a second memory MEM 10 for storing the intensity filtered last for the pixel treated.

At the present instant t, at which the filtered intensity $P_t^C$ is to be calculated, the memory MEM 10 thus contains the filtered intensity $P_{t-1}^C$ corresponding to the preceding instant and hence outputs $P_{t-1}^C$ on its output.

The intensity filtered at the preceding instant $P_{t-1}^C$ is applied to the adder 12 at the same time as the noisy intensity $I_t^P$ observed at the instant t. The adder 12 outputs the difference between the two intensities, one noisy at the instant t and denoted as $I_t^P$, and the other filtered at the instant t–1 and denoted as $P_t^C$.

The Table LUT 14 takes the absolute value of the difference supplied by the adder 12 and also receives the denominator $S_t^C$. The Table LUT 14 then outputs the argument $Z^C$ of the function $F^C(Z)^C$:

$$z^C = \frac{\Delta^C}{S_t^C} = \left| \frac{I_t^P - P_{t-1}^C}{\sigma_B \sqrt{\frac{2}{2 - K_{t-1}^C}}} \right| \qquad (12^C)$$

The look-up table LUT 15 contains the chosen function $F^C(Z^C)$ in tabulated form. The input of the table LUT 15 receives the argument $Z^C$ and this table outputs the continuity coefficient $\alpha_t^C$:

$$\alpha_t^C = F^C \left( \frac{\Delta^C}{S_t^C} \right)$$

The Table LUT 16 contains the tabulated formulation for supplying the gain at the instant t on the basis of the gain at the preceding instant, arriving from the memory MEM 17, and on the basis of the continuity coefficient $\alpha_t^C$ arriving from the table LUT 15. This gain:

$$K_t^C = \frac{K_{t-1}^C}{K_{t-1}^C + \alpha_t^C} \qquad (4^C)$$

is supplied via the output of the table LUT 16 and applied on the one hand to the memory MEM 17 so as to replace the value of the gain $K_{t-1}^C$ of the preceding instant, and on the other hand to a multiplier 19.

The Integration Function ($3^C$) Can Now be Calculated

The adder 18 first receives the noisy signal observed at the instant t, denoted as $I_t^P$ and arriving from the input 100 via a second channel, and the signal filtered at the preceding instant t–1 and originating from the output of the memory MEM 10, and outputs the difference $I_t^P - P_{t-1}^C$.

This difference is applied from the adder 18 to the multiplier 19 at the same time as the gain $K_t^C$ from the table LUT 16. The multiplier 19 forms the product $$K_t^C \times (I_t^P - P_{t-1}^C)$$

and outputs the result.

The adder 20 receives on the one hand the product from the multiplier 19 and on the other hand the signal already filtered at the preceding instant, denoted as $P_{t-1}^C$, and originating from the memory MEM 10. The adder applies the value of the intensity filtered at the instant t to the general output 200 of the filter. In the memory MEM 10 this filtered value $P_t^C$ also replaces the intensity filtered at the instant t–1, entered via the input 120 of the memory 21, in conformity with the integration equation:

$$P_t^C = P_{t-1}^C + K_t^C \times (I_t^P - P_{t-1}^C) \qquad (3^C)$$

It is to be noted that the device described above necessitates only the storage of the filtered sample $P_{t-1}^C$ and of the gain $K_{t-1}^C$ of the preceding instant and furthermore requires only the value of the noisy intensity $I_t^P$ of the present instant in order to carry out the temporal filtering method. It is not absolutely necessary to store the intensity arriving at the input 100.

After the filtering of the various pixels of the present image, this image is displayed, for example on the monitor 7 of the display device shown in FIG. 1. The various images of the sequence can thus be displayed after completion of their respective treatment.

I claim:

1. A method for temporal filtering of noise in an image ($J_t^P$), which is referred to as the present image and forms part of a sequence of images in the form of two-dimensional matrices of pixels which have digitized, noisy intensity values which are referred to as samples ($I_j(x,y)$), the method comprising:

evaluating a present filtered causal sample ($P_t^C$), sample which is the temporal filtering of a present noisy sample ($I_t^P$) corresponding to a pixel in a given location (x,y) in the present image, by forming a linear combination of the present noisy sample ($I_t^P$) and earlier samples in the sequence, referred to as noisy causal samples ($I_j^C$), multiplied by weights ($b_j^C$), which constitute coefficients between 0 and 1 of a probability of intensity continuity between said noisy causal sample, whereto the weight is attached, and the present noisy sample, the weight attached to the present noisy sample having the value 1.

2. A method as claimed in claim 1, in which the weight attached to a given causal noisy sample is the product of coefficients of probability of continuity between the successive noisy causal samples, from the given causal noisy sample until the present noisy sample, and in which the linear combination of the causal noisy samples and present noisy sample is normalized by the sum of the weights relating to said samples.

3. A method as claimed in claim 2, in which for the evaluation of the present filtered causal sample ($P_t^C$) of the present instant (t) the linear combination is formed by performing the evaluation of a recursive relation, referred to as a causal integration relation, comprising the determination of a sum of the filtered causal sample ($P_t^C$) of the preceding instant (t−1) and the product of a factor, referred to as a causal gain factor ($K_t^C$) of the present instant, and a difference between the present noisy sample ($I_t^P$) and the filtered causal sample ($P_{t-1}^C$) of the preceding instant.

4. A method as claimed in claim 3, in which said causal gain factor ($K_t^C$) of the present instant (t) is evaluated in a recursive manner by the ratio of a causal gain factor ($K_{t-1}^C$) of the preceding instant (t−1) to the sum of said causal gain factor ($K_{t-1}^C$) of the preceding instant and a causal continuity coefficient ($\alpha_t^C$).

5. A method as claimed in claim 4, in which the evaluation of the causal integration relation comprises:
   the determination of the absolute value of a causal difference ($\Delta^C$) between the present noisy sample ($I_t^P$) of the present instant (t) and the filtered causal sample ($P_{t-1}^C$) of the preceding instant, and
   the determination of the causal continuity coefficient ($\alpha_t^C$) as a decreasing function ($F^C$) of said causal difference ($\Delta^C$).

6. A method as claimed in claim 5, in which for the evaluation of the causal continuity coefficient ($\alpha_t^C$) the decreasing function is a causal function ($F^C$) whose argument ($z^C$) is given by the causal difference ($\Delta^C$), normalized by a factor ($S_t^C$) that takes into account the variance of the noise relative to each sample of the causal difference.

7. A method as claimed in claim 6, in which the causal decreasing function ($F^C$) has a constant maximum value smaller than or equal to 1 when its argument ($Z^C$) is between 0 and 1 and decreases to a minimum value equal to or larger than zero when its argument is larger than 1.

8. A method as claimed in claim 7, in which the filtering power is controlled by the maximum and minimum values of the causal decreasing function ($F^C$) which are chosen so as to smooth the noise peaks and to smooth the noise teeth which follow the discontinuities due to a spatial movement.

9. The method of claims 6 wherein said normalization factor ($S_t^C$) is evaluated by multiplying a standard deviation of the noise ($\sigma_B$) by the square root of two divided by two minus said causal gain factor ($K_{t-1}^C$) of the preceding instant.

10. A method as claimed in claim 4, in which said causal gain factor ($K_t^C$) is the inverse of the sum of the weights attached to the causal samples of the linear combination, and the causal continuity coefficient ($\alpha_t^C$) is the weight of the causal sample ($I_{t-1}^C$) preceding the present sample ($I_t^P$).

11. A method as claimed in claim 10, in which the evaluation of the causal integration relation comprises:
   the determination of the absolute value of a causal difference ($\Delta^C$) between the present noisy sample ($I_t^P$) of the present instant (t) and the filtered causal sample ($P_{t-1}^C$) of the preceding instant, and
   the determination of the causal continuity coefficient ($\alpha_t^C$) as a decreasing function ($F^C$) of said causal difference ($\Delta^C$).

12. A method as claimed in claim 11, in which for the evaluation of the causal continuity coefficient ($\alpha_t^C$) the decreasing function is a causal function ($F^C$) whose argument ($z^C$) is given by the causal difference ($\Delta^C$), normalized by a factor ($S_t^C$) that takes into account the variance of the noise relative to each sample of the causal difference.

13. A method as claimed in claim 12, in which the causal decreasing function ($F^C$) has a constant maximum value smaller than or equal to 1 when its argument ($z^C$) is between 0 and 1 and decreases to a minimum value equal to or larger than zero when its argument is larger than 1.

14. A method as claimed in claim 13, in which the filtering power is controlled by the maximum and minimum values of the causal decreasing function ($F^C$) which are chosen so as to smooth the noise peaks and to smooth the noise teeth which follow the discontinuities due to a spatial movement.

15. The method of claims 12 wherein said normalization factor ($S_t^C$) is evaluated by multiplying a standard deviation of the noise ($\alpha_B$) by the square root of two divided by two minus said causal gain factor ($K_{t-1}^C$) of the preceding instant.

16. A device for temporal filtering of noise in images which are part of a sequence of images, each image being in the form of a matrix of pixels, comprising:
   an image processing system for supplying a present noisy digitized sample ($I_t^P$) of a pixel having a given location (x,y) in an image ($J_t^P$) in the form of a matrix of pixels arriving at a present instant (t), and
   a sub-assembly, referred to as a causal sub-assembly, whose input receives the present noisy sample ($I_t^P$) and which comprises
   a memory for supplying a digitized filtered causal sample ($P_{t-1}^C$) of the preceding pixel, in the same location (x,y) in the matrix of the instant at the given location and a digitized noisy causal sample ($I_{t-1}^C$) of the preceding instant at the given location,
   a memory for supplying a causal gain factor ($K_{t-1}^C$) of the preceding instant, and
   calculation means for evaluating a causal integration equation and for delivering on its output the value of a present filtered causal sample ($P_t^C$), which is the temporal filtering of the noisy present sample ($I_t^P$),
   wherein the causal integration equation is a recursive relation comprising a sum of the filtered causal sample ($P_{t-1}^C$) of the preceding instant (t−1) and the product of a causal gain factor ($K_t^C$) of the present instant (t), and a difference between the present noisy sample ($I_t^P$) and the filtered causal sample ($P_{t-1}^C$) of the preceding instant.

17. A device as claimed in claim 16, in which the calculation means for evaluating the causal integration equation and for delivering the filtered causal sample ($P_t^C$) comprise:
   an adder for determining an absolute value of a causal difference ($\Delta^C$) between the present noisy sample ($I_t^P$) of the present instant (t) and the stored filtered causal sample ($P_{t-1}^C$) of the preceding instant (t−1), and tables for determining a causal continuity cofficient ($\alpha_t^C$) as a decreasing function ($F^C$) of the causal difference ($\Delta^C$) normalized by a factor ($S_t^C$) of the variance of the noise ($\sigma_B$),
   a table for determining a factor ($K_t^C$), referred to as the causal gain factor of the present instant (t) and equal to the quotient of the stored causal gain factor ($K_{t-1}^C$) of the preceding instant (t−1) and the sum of said causal gain factor ($K_{t-1}^C$) of the preceding instant and the causal continuity coefficient ($\alpha_t^C$),
   adders and a multiplier for determining the sum of the filtered causal sample ($P_{t-1}^C$) of the preceding instant (t−1) and the product of said causal gain factor ($K_t^C$) of the present instant and a difference between the noisy present sample ($I_t^P$) and the filtered causal sample ($P_{t-1}^C$) of the preceding instant, thus producing the value of the present filtered causal sample ($P_t^C$).

18. A device for observation of a medical image, comprising;

a system for supplying data of a sequence of medical images, each image being in the form of a two-dimensional matrix of pixels having digitized intensity values,     an image display system, and     an image processing system having access to the data of the sequence of images and to the display system, said image processing system including a device as claimed in claim 10.

19. A device for observation of a medical image, comprising;

a system for supplying data of a sequence of medical images of medical images, each in the form of a two-dimensional matrix of pixels having digitized intensity values,     an image display system, and     an image processing system having access to the data of the sequence of images and to the display system, said image processing system including a device as claimed in claim 11.

\* \* \* \* \*

UNITED STATES PATENT AND TRADEMARK OFFICE
CERTIFICATE OF CORRECTION

PATENT NO.   : 5,909,515  
DATED        : June 1, 1999  
INVENTOR(S)  : Sherif Makram-Ebeid Page 1 of 1

It is certified that error appears in the above-identified patent and that said Letters Patent is hereby corrected as shown below:

Column 15,  
Line 12, change "$P_t^C$" to -- $P_{t-1}^C$ --.

Signed and Sealed this

Twenty-second Day of October, 2002

Attest:

JAMES E. ROGAN  
Attesting Officer     Director of the United States Patent and Trademark Office